United States Patent [19]
Plefkey

[11] 3,805,416
[45] Apr. 23, 1974

[54] PHONICS TEACHING DEVICE

[76] Inventor: Janet D. Plefkey, 230 20th Ave. South, South St. Paul, Minn. 55075

[22] Filed: June 1, 1973

[21] Appl. No.: 366,151

[52] U.S. Cl. .................................. 35/35 D, 35/9 D
[51] Int. Cl. ............................................ G09b 7/00
[58] Field of Search ............ 35/9 R, 9 B, 9 D, 35 D

[56] References Cited
UNITED STATES PATENTS

| | | | |
|---|---|---|---|
| 3,067,524 | 12/1962 | Parker | 35/9 D |
| 3,146,534 | 9/1964 | Brown et al. | 35/35 D |
| 3,314,165 | 4/1967 | Shreck et al. | 35/35 D X |
| 3,646,592 | 2/1972 | Bosley et al. | 35/9 D |

Primary Examiner—Wm. H. Grieb
Attorney, Agent, or Firm—Janet D. Plefkey

[57] ABSTRACT

A teaching device in which the teacher may insert one or two plastic snap-in letter cards having different letters thereon adapted to be illuminated from behind. The child may then insert plastic word cards which have words displayed thereon with letters missing; the missing letters designed to correspond with the letters on the letter cards. The letter cards and the word cards have corresponding indentations and prongs which fit together only when the proper word is chosen for the proper letter. Once fitted together, the prongs pass through the indentations in the letter cards to activate a switch and illuminate a light behind a letter card thus indicating a successful match.

5 Claims, 7 Drawing Figures

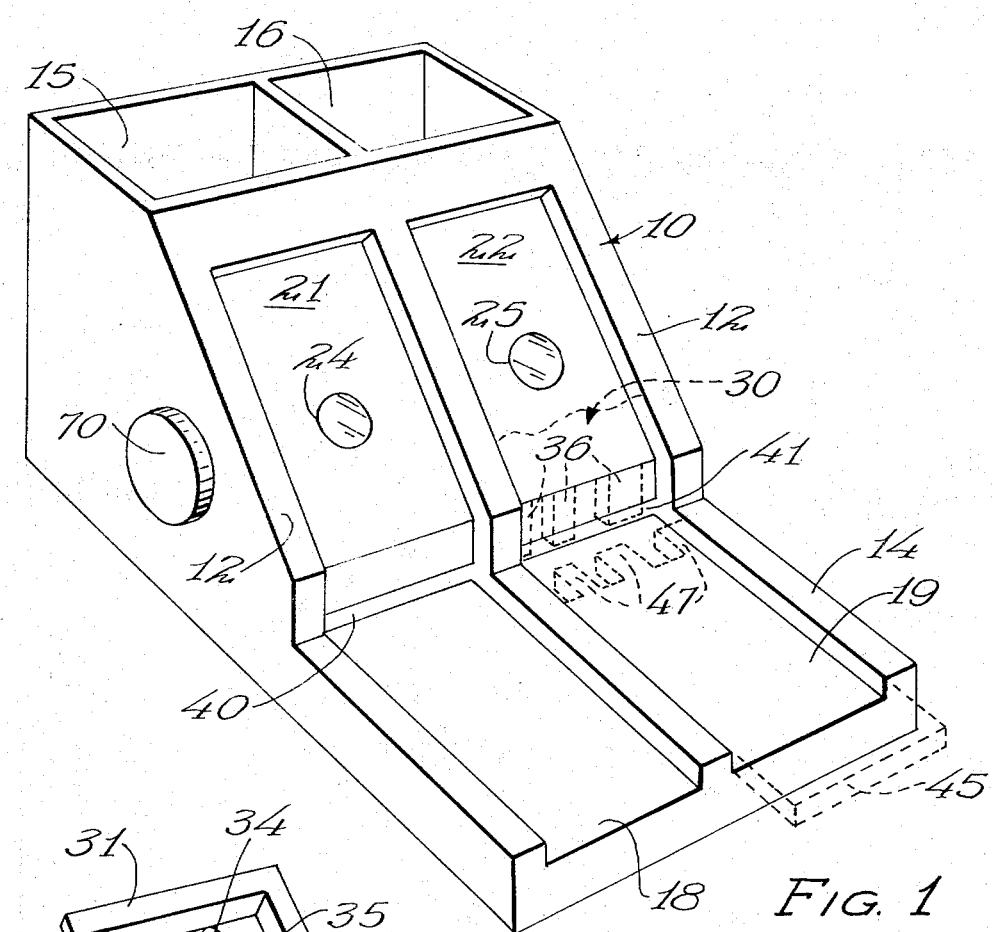
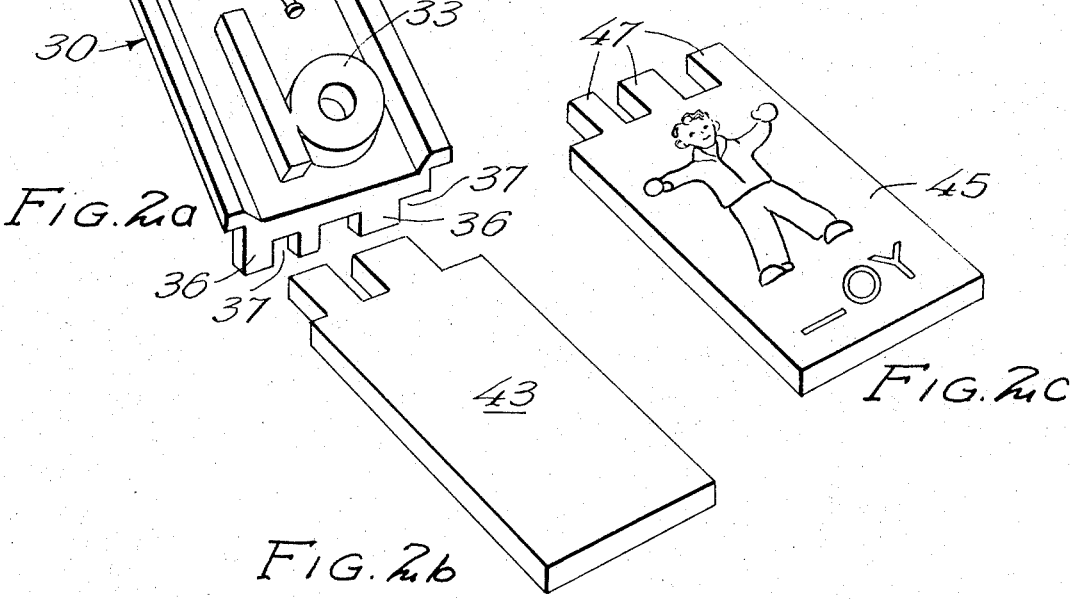
Fig. 1
Fig. 2a
Fig. 2b
Fig. 2c

PHONICS TEACHING DEVICE

BACKGROUND OF THE INVENTION

The importance of teaching reading and language to children is, of course, self evident. Today in the teaching arts there are many different theories and approaches used in teaching reading. But whatever theory or approach is utilized all agree that it is particularly advantageous if a mechanism can be provided whereby the child's interest is kept at a high level. My invention contemplates a new and novel teaching device which produces a very high interest level. Since the device allows a child to manipulate plastic cards and slide them in slots and also incorporates lights that illuminate the letters in question the child is attracted thereto and enjoys utilizing the device thus encouraging his learning process. In the preferred embodiment, only two choices are presented to the child at any given time so as to keep the task easy. If he successfully matches the word to the proper letter he is immediately rewarded by a light that illuminates the letter card. Because of the design of my invention the children have the opportunity to work independently or with a teacher. The device can also be used as a game so the children may play with each other in matching word cards and letter cards. The device is portable, may be moved readily, and is safe in operation and therefore is particularly adaptable to use by young children.

SUMMARY OF THE INVENTION

To accomplish the above stated ends my invention contemplates a panel type machine having an inclined face and a horizontal face at the base of the inclined face. Two indented generally rectangular areas are provided on the inclined face for snap-in plastic letter cards. On the horizontal face two indented generally rectangular areas are provided which accept slide-in word cards. A number of small slots are provided in the lower edge of the snap-in letter cards which slots lie directly in the path of the slide in word cards. The word cards are provided with prongs which may or may not fit in the slot depending upon whether the word on the word card can be properly spelled with the letter on the letter card. If the match is correct the prongs do fit and they pass through to an electrical switch inside thus activating a battery powered light to illuminate the letter card from behind. This illumination indicates a successful match for the child and he may then place the word cards in suitable storage bins at the back of the device.

It may therefore be seen that it is an object of my invention to provide a teaching device in which the combined tactile and visual experience of matching word cards to letter cards helps maintain the interest of the child and therefore greatly aids in the teaching of the language. Further objects and advantages will become apparent from the following description and drawings.

BRIEF DESCRIPTION OF THE DRAWINGS

FIG. 1 is a perspective view of the teaching device of my invention showing the indentations therein for accepting word and letter cards.

FIG. 2a shows a snap-in letter card that will fit in the indentations on the inclined face of the teaching device.

FIGS. 2b and 2c show two different word cards which can be slid into the indentations on the horizontal surface of the teaching machine.

DESCRIPTION OF THE PREFERRED EMBODIMENT

Figure 3:
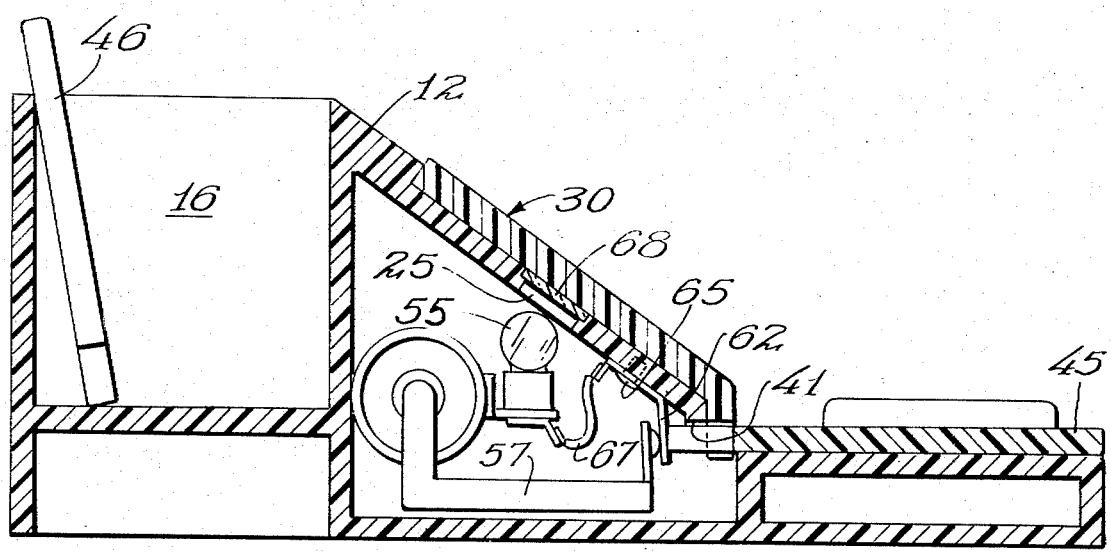
FIG. 3 is a schematic sectional side view of the device showing generally the arrangement of parts inside for illuminating the back of the snap-in letter cards.

Referring to FIG. 1 a perspective view of my invention is shown. A panel type housing 10 is provided which may be constructed, for example, from one or more pieces of molded plastic. The housing is provided with an inclined face 12 and a horizontal front face 14. At the back of the device are two storage bins 15 and 16. Generally rectangular indentations 18 and 19 are provided on the horizontal surface 14 and a pair of generally rectangular indentations 21 and 22 are provided on the inclined face 12. A pair of holes 24 and 25 are included on the flat bottom surface of indentations 21 and 22. Holes 24 and 25 permit light from bulbs inside the device to illuminate the snap-in letter cards that go in indentations 21 and 22. One of these snap-in letter cards is shown in FIG. 2a.

Snap-in letter card 30 is sized to fit exactly into indentation 21 or indentation 22. An additional rim 31 is provided around three sides of the snap-in letter card to permit the card to be easily grasped and removed from the indentation 21. A letter 33 is embossed on the surface of the letter card 30 and in FIG. 2a is shown as a small letter b. Letter 33 is constructed from a milky white translucent plastic whereas the rest of the letter card 30 is constructed from an opaque plastic. In this way when letter card 30 is inserted into indentation 21 or 22 and a correct match is made, the illuminating light from holes 24 and 25 lights up the letter 33 indicating a correct match. Additional visual aids may be provided on the surface of letter card 30 as desired. In FIG. 2a a small bat and ball 34 and 35 are included which figures are familiar to small children and help associate the letter b as the words "bat" and "ball" both begin with b.

At the bottom edge of letter card 30 are molded a series of extensions 36 and slots 37. These slots rest directly in front of openings 40 and 41 at the base of the inclined face 12 of the teaching apparatus. Thus, the entry to slots 40 and 41 is blocked to all word cards except those having the correct prongs mounted on the end thereof. Two such word cards are shown in FIGS. 2b and 2c. The first word card is indicated by the numeral 43 and, as can be seen, will not pass through the non-corresponding slots 37 in letter card 30. In normal use, letter cards 30 are snapped into the indentations 21 and 22 by the teacher. The child is then provided with a plurality of word cards such as shown in FIGS. 2b and 2c which he attempts to insert in slots 18 and 19 so as to illuminate the light. Word card 43, however, is not the correct card and therefore will not pass through the slots 37 in the base of letter card 30. However, as shown in FIG. 1 by dotted lines, if letter card 30 is snapped into slot 22 and a correct word card 45 is chosen the prongs on card 45, indicated by the numeral 47 in FIG. 2c, fit neatly into slots 37 in the letter card. Thus the word card 45 of FIG. 2c can be fitted into the slot 19 by a child and the prongs 47 extended through the slots 37 in the letter card 30 so as to pass through opening 41 in the housing 10. The child is provided with additional clues by providing the word cards with a picture of a boy to correlate with the word boy with the letter *b* omitted. In matching the missing letter to the letter on card 30 the child successfully intermeshes the two plastic cards and illuminates a light by the mechanism shown in FIG. 3.

Figure 4:
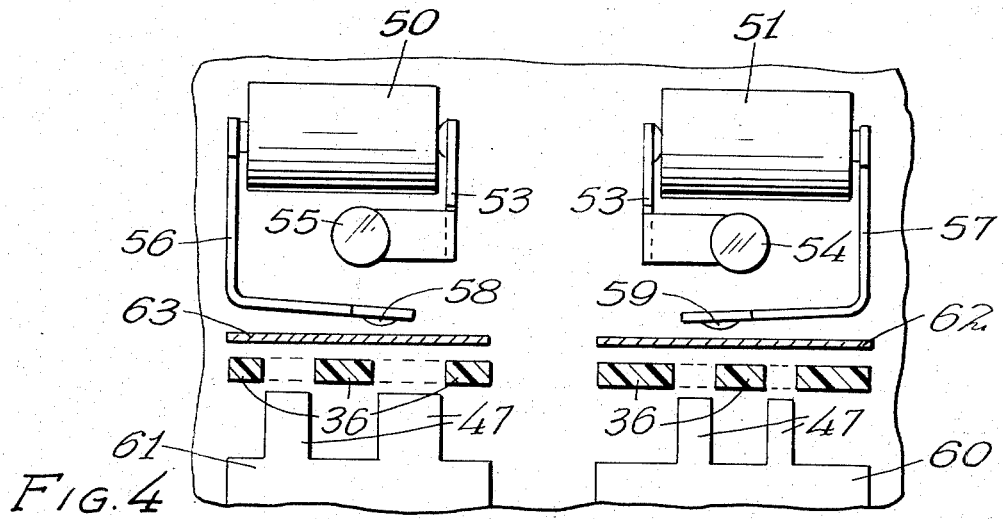
FIGS. 4 and 5 show how the movement of the word cards into the slots of the snap-in letter cards activates a switch so as to turn on a light bulb.
Figure 5:
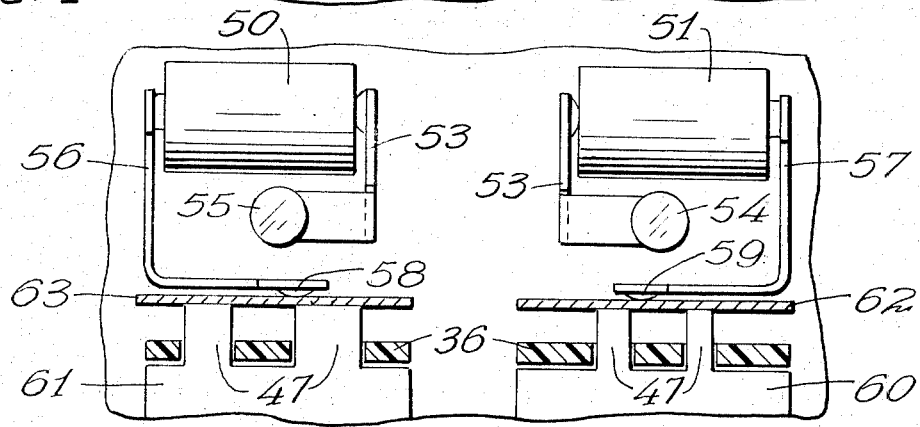

Referring simultaneously to FIGS. 3, 4, and 5 it may be seen that a pair of batteries 50 and 51 are mounted in electrical clips inside the device and underneath the inclined face 12. The batteries are held in clips of a design well known to those skilled in the art and are thus shown schematically in the drawings. The negative ends of the battery are connected by means of suitable clips 53 to the base of a pair of lightbulbs 54 and 55. The positive end of the batteries 50 and 51 are connected by means of suitable clips 56 and 57 respectively to contact points 58 and 59. When the correct word cards 60 and 61 are inserted into and through the slots on the letter cards as shown in FIG. 5 the prongs on the word cards 60 and 61 push a pair of metal contacts 62 and 63 against the contact points 58 and 59. In FIG. 3 it can be seen that contact tab 62 is riveted to the underside of the inclined face by a rivet 65. From there a small wire is used to bring the electrical lead 67 to the positive terminal of the lightbulb 55. Lightbulb 55 is placed immediately beneath hole 25 and hole 25 is provided with a transparent lens 68. Similar connections are made for lightbulb 54. When a match is correctly made the corresponding lightbulb 54 or 55 is illuminated and the light passes through hole 24 or 25 to illuminate the letter 33 on the face of the letter card 30. After a successful match the word card may be positioned in the storage compartment 16 as shown by word card 46.

Returning to FIG. 1 it may be seen that a removable knob 70 is provided on each side of the device for easy replacement of the batteries and the bulbs. The letters are embossed upon the surface of the letter cards to provide a tactile experience and indicate more completely the shape of the letter to the child. Normally in the upper right hand corner of the letter card a drawing is provided of an object that begins with the same sound as the letter shown, as for example, a cat might be shown for the letter *c*. For the letter *b*, however, a bat and ball are provided both which begin with the letter *b* but which together may be positioned in the shape of the *b* to help distinguish it from the letter *d* which is often confused by small children. In the case of the letter *d* for example a donut could be drawn over the circle of the *d*. The missing letter in the word may be replaced either by a line as shown in FIG. 2c or by a small rectangular box where the missing letter is to be placed.

I claim:

1. A teaching device comprising in combination:
a housing having a plurality of pairs of first and second indentations therein, each first indentation contiguous to a corresponding second indentation;

a plurality of letter cards adapted to have letters thereon and fit into said first indentations and further having unique series of slots at one end;

a plurality of word cards adapted to have words thereon and fit into said second indentations and further having a complementary series of slots at one end arranged to intermesh with the slots in the ends of the corresponding letter cards;

switch means in said housing positioned to be activated by the fitting together of a word card and a letter card in said first and second indentations, and light means connected to battery means through said switch means so as to illuminate said cards.

2. The device of claim 1 in which said housing has an inclined face containing said first indentations and a horizontal face containing said second indentations.

3. The device of claim 2 in which said letter cards have peripheral rims so as to permit said letter cards to snap into said first indentations.

4. The device of claim 3 in which said word cards are sized to slide into said second indentations so that the slots in the end can intermesh with the slots on the end of the letter cards an pass through a hole in said housing to contact said switch means.

5. The device of claim 4 including storage bins at the rear of the housing.

* * * * *